United States Patent [19]

Francis

[11] Patent Number: 4,957,534
[45] Date of Patent: Sep. 18, 1990

[54] NOVEL ORGANIC FERTILIZER AND PRODUCTION THEREOF

[76] Inventor: Dawn E. Francis, 1347 Nicolet, Detroit, Mich. 48207

[21] Appl. No.: 230,780

[22] Filed: Aug. 10, 1988

Related U.S. Application Data

[63] Continuation-in-part of Ser. No. 947,741, Dec. 30, 1986, abandoned.

[51] Int. Cl.⁵ ............................................. C05F 11/00
[52] U.S. Cl. ......................................... 71/23; 71/25; 47/576; 47/DIG. 9
[58] Field of Search .................... 71/1, 9, 10, 11, 22, 71/23, 25; 47/57.6, DIG. 9

[56] References Cited

U.S. PATENT DOCUMENTS

| | | | |
|---|---|---|---|
| 310,759 | 5/1943 | Alberizzi | 47/DIG. 9 |
| 3,431,676 | 3/1969 | Addin | 71/22 X |
| 3,934,999 | 1/1976 | Meier | 71/23 X |
| 4,308,047 | 12/1981 | Holland | 71/23 |

FOREIGN PATENT DOCUMENTS 1087098  4/1984  U.S.S.R. ............................ 47/57.6

OTHER PUBLICATIONS

Bruttini "Uses of Waste Materials", 1923, pp. 110–111, 196–197, 225, and 251.
Van Slyke, L. L., and Bosworth, Alfred, New York Agr. Expt. Sta., *Tech. Bull.* 48, 3–12 (1916).
Trainer, S. B., *Canadian Chem. J.*, vol. II, No. 3, pp. 71–72 (Mar. 1918).

*Primary Examiner*—Ferris H. Lander
*Attorney, Agent, or Firm*—Gordon W. Hueschen

[57] ABSTRACT

A novel biodegradable organic fertilizer comprising (A) dead leaves of any type, preferably dried, finely ground, and deciduous, (B) skim milk, dried and powdered and essentially fat free, and (C) water in an amount to give a kneadable mass, the composition being dried and granular, and its production and use, are disclosed. The proportions of A to B by volume are generally between about 1:1 and 10:1, usually between about 1:1 and 6:1, and preferably about 4:1. The fertilizer composition or "compound" is cost effective and readily manufactured, does not contaminate or burn the soil or plantlife, readily supports and improves plant growth, and improves seed and/or plant product yield.

5 Claims, No Drawings

NOVEL ORGANIC FERTILIZER AND PRODUCTION THEREOF

This application is a Continuation-in-Part of Ser. No. 947,741, filed Dec. 30, 1986 and now abandoned.

BACKGROUND OF INVENTION

1. FIELD OF INVENTION

Fertilizers, Organic Fertilizers, Natural Biodegradable Organic Fertilizers.

2. PRIOR ART

World trade in fertilizers is dependent upon the availability of phosphate in as pure form as feasible (1).

(1) R. P. Sheldon, "Phosphate Rock", Sci. Am. 246(6), p. 45, June, 1982.

For the most part, farming, particularly in the developed countries, is highly mechanized, and the machines made to spread fertilizer call for a granulated product that does not become sticky in contact with moist air. As a result, current methods of manufacturing fertilizer ordinarily turn out chemically complex mixed compounds such as diammonium phosphate. Moreover, the fertilizers tend to be highly concentrated in order to cut down the amount of material that must be handled in the delivery system and by the farmer.

These practices impose rigorous standards of quality on the raw materials used in the manufacture of fertilizer by traditional means. For instance, some phosphate rock, of which there are large world reserves, contains varying amounts of the oxides of iron, aluminum and magnesium. Phosphate rock with excessive amounts of these elements cannot be used economically in modern manufacturing because the gels of such rock clog the filters and pipes of manufacturing equipment. More than this, such deposits cannot be mined economically.

There are several advantages to employing the improved method of the invention to manufacture a natural, biodegradable and cost-effective fertilizer over other methods currently in use.

Other fertilizer manufacturing methods have a need for the absence of metallic impurities such as iron oxide, alumina and magnesia, found in phosphate rock deposits. These cause the formation of gels which interfere with the manufacturing process, increasing costs of production.

In the present invention, powdered and dried skim milk which is essentially fat free is used as a principal ingredient because it is a natural source of phosphate in the form of free and structurally-bound phosphates, of free and structurally-bound calcium, and contains an abundance of nitrogen and potassium, all necessary to plant formation and growth.

In other methods, phosphate rock with excessive amounts of metallic elements, some essential for plant growth, cannot be utilized economically. The main processes for manufacturing phosphate fertilizers call for the dissolution of these elements in the phosphate rock by sulfuric acid, which is an energy-expensive commodity.

In the present invention, dried plant leaves which have completed their life cycles, i.e., dead leaves, and which have been ground to a powder in order to produce a great increase in surface area available for chemical reaction, have been chosen as a principal ingredient because, in this state, their trace metals and/or elements and nitrogen content, all necessary for good plant growth, are most readily available to the plant root and soil bacteria systems, once growing conditions have been established. The use of this ingredient, particularly in the powdered form, is a principal factor in rendering the manufacturing process and ultimate product highly cost-effective.

Much phosphate rock is shipped by sea, and so, in other fertilizer manufacturing methods, the grade of rock must be kept high in order to hold down the shipping cost per unit of phosphate. Also, shipping encounters wide variations of atmospheric conditions in heat and humidity, demanding that the final form of the shipped compound maintain high stability in order to remain cost-effective.

In the present invention, the third ingredient, water, when used minimally with the well-mixed powders of preferably deciduous leaves and dried and powdered skim milk which is essentially fat free, is believed to create a chemically-bonded substance or composition, the final form of which, when dried of excess moisture, yields a granulated "compound" resembling neither powder in the original form. No impurities to the natural organic fertilizer compound are present. The component content remains unchanged.

Water, whether pure, natural or treated, assists in or instigates a chemical bonding between the other two ingredients, yielding a new end-product composition or "compound". Upon removal of excess moisture by air or mild heat drying, the resulting composition or "compound" is a well-granulated, highly stable compound which remains so under wide variations or changes of atmospheric conditions of heat and humidity, all components necessary to plant growth remaining intact.

As will be and become apparent, the fertilizer composition of the present invention serves admirably in fulfilling a long-felt need and effectively accomplishes all of the objectives of the present invention, as set forth hereinafter.

OBJECTS

It is an object of the present invention to provide a novel and improved natural biodegradable organic fertilizer. It is another object to provide a novel biodegradable organic fertilizer comprising (A) dead leaves of any type, which are preferably dried, finely ground, and deciduous, (B) dried and powdered skim milk which is essentially fat free, and (C) water in an amount to give a kneadable mass, the composition being dried and granular, wherein the proportions of A to B by volume are generally between about 1:1 and 10:1, usually between about 1:1 and 6:1, and preferably about 4:1, which fertilizer composition or "compound" is cost effective and readily manufactured, does not contaminate or burn the soil or plantlife, readily supports and improves plant growth, and improves seed and/or plant product yield. It is a further object to provide a method for the preparation or production of such a fertilizer. Other objects will be apparent to one skilled in the art and additional objects will become apparent hereinafter.

SUMMARY OF THE INVENTION

What I believe to be my invention, then, *inter alia*, comprises the following:

A novel biodegradable organic fertilizer comprising (A) dead leaves dried and finely ground, (B) skim milk which is dried and powdered and essentially fat free, and (C) water in an amount to give a kneadable mass, the composition being dried and granular; such a fertilizer wherein the proportions of A to B by volume are between and 1:1 and 10:1; such a fertilizer wherein the proportions of A to B by volume are between about 1:1 and 6:1; such a fertilizer wherein the proportions of A to B by volume are about 4:1; and the method of producing such a fertilizer comprising the steps of drying and finely dividing dead leaves, admixing the same with dried and powdered skim milk which is essentially fat free, kneading the same into a mass in the presence of a sufficient amount of water for this purpose, and drying and granulating the mass.

IN GENERAL

This invention relates to an improved fertilizer and method of fertilizer manufacture which is accomplished by taking three components in their natural form, treating them as described herein, and mixing them into a substance which takes a final form different from any of those forms held initially by the three substances.

The nature of the invention consists in taking skim milk—obtained from any animal which provides such a substance—which has been dried and powdered (the milk having been brought to the dried and powdered state by any well-known means, e.g., physico-chemical means) and which is essentially fat free and mixing it with finely ground dried leaves which have undergone their full cycle of life, i.e., dead leaves, no matter from which source of deciduous or non-deciduous plant (preferably deciduous trees) such leaves have been obtained.

This dry mixture is then treated with a minimum amount of water, whether in a purified, chemically-treated, or natural state. Water is believed to create a chemical bonding between the two principal components, stabilizing the product upon removal of excess moisture. Ready granulation of the product, which follows air- or minimal-heat drying of the blend, results in the final product: a well-granulated, easily distributable, natural, biodegradable organic plant fertilizer.

The stability of the granulated final product is believed to be attributable to a unique composition or chemically-bonded "compound", now in its dry state. Thus, the "compound" is able to withstand deterioration while being transported over long distances for extended periods and under varying conditions of plant growth.

The proportions of leaf powder to milk by volume are generally between about 1:1 and 10:1, usually between about 1:1 and 6:1, and preferably about 4:1. The dry granular fertilizer composition or "compound" is cost effective and readily manufactured, does not contaminate or burn the soil or plantlife, readily supports and improves plant growth, and improves seed and/or plant product yield.

DETAILED DESCRIPTION OF THE INVENTION

The following Preparations and Examples are given by way of illustration only.

Preparations:

Various fertilizer compositions having a proportion of A to B between 1:1 and 10:1, especially 1:1 and 6:1, and preferably about 4:1, are prepared in the manner given in the foregoing under "IN GENERAL" and employed as fertilizer, along with controls, in various plant growth-promoting experiments.

In greater detail, leaves, which have naturally separated from the tree (preferably, deciduous trees), and which have undergone their full cycle of life, i.e., dead leaves, are desiccated, either naturally or artificially through the application of mild heat.

This dried material is then ground finely in a grinding machine suitable for the purpose and passed through a screen or series of screens, i.e., a sieving system, e.g., a U.S. Number 40 sieve system. The dried, ground leaf powder is referred to in this document as Component A.

Milk, obtained from any animal which provides such a substance, and which has been skimmed and brought to the dried and powdered state by well-known means, e.g., physico-chemical means, and which is essentially fat free, is referred to in this document as Component B.

Measuring in parts per volume, dry Component A as the variable is intermixed with one (1) part per volume of dry powdered skim milk, referred to in this document as Component B. Stirring or other commonly known machines employed for dry mixing are used to blend the substances together in the dry state. Components should be well mixed before proceeding to the next step.

Minimal water, pure, natural or treated, is then added gradually, with stirring, until a well-kneaded, self-adhering, brownish mass results. The resulting brown mass is then dried by tossing at moderate temperatures to remove excess moisture, spreading to air dry, or placing in a dessicating chamber. Upon removal of all moisture by drying, the composition is readily crumbled into a brown granulated substance.

Now ready for use, the fertilizer blend may be spread upon the prepared ground in the usual manner, ready for tilling into the soil.

The notation of "A/B" used in this document should be interpreted as "the proportion of parts by volume of Component A to one part by volume of Component B".

The Study

The study was carried out in a temperate zone over an 86-day growth period and during a growing season having higher than normal rainfall. The project was carried out on a 67- by 45-foot lot, divided into two sections. Each section was divided into three groups (see Table I). Four rows per group were planted, each with about fifty specimens. Two seeds per specimen were initially planted six inches apart, and these were later thinned to singlets, after a growth of six to eight inches had been achieved.

Section I was planted with Hodgson Soybean as requisite legume and Section II was planted with Corn L2350, as requisite grass. Seeds were supplied by Hyland Seeds, a division of W. G. Thompson and Sons, Ltd., Blenheim, Ontario, Canada.

The Procedure

Three groups each of soybean and corn were planted in the requisite four rows in soil which had been previously cleared of debris, plowed, deweeded and finally cross-tilled to assure that weed roots were at a minimum.

Each of the four rows comprising a group was set three feet apart and groups were set apart from each other by six feet. Each row line was fertilized and planted exactly the same, both in blend content and physical depth, whether grass or legume, hole method or furrowed hill, i.e., Group I Row I Corn (CI-R1) contained the same fertilizer blend at the same planting depth as did Group I Row I Soybean (SI-R1).

The cleared land was then staked, and rows were set for initial planting.

Fertilization

The first row in each group was given no fertilizer, to provide a blank or "control" against results. To test the growth and yield effects of Components A and B, each independently, these were used as fertilizers in their pure, dry state. Component A only was applied in Group I, Row 2. Component B only was tested under two separate physical depth conditions, the hole method in Group II, Row 2 and the furrowed hill method, Group III, Row 4.

The complete blend plantings were made as given in TABLE II.

TABLE II

| Group | Row | Blend A/B | Remarks |
|---|---|---|---|
| I | 1 | 0/0 | |
|  | 2 | 1/0 | |
|  | 3 | 2/1 | |
|  | 4 | 4/1 | |
| II | 1 | 0/0 | |
|  | 2 | 0/1 | |
|  | 3 | 3/1 | |
|  | 4A | 4/1 | Specimens 1–16 |
|  | 4B | 6/1 | Specimens 17–55 |
| III | 1 | 0/0. | |
|  | 2 | 2/1 | |
|  | 3 | 4/1 | |
|  | 4 | 0/1 | |

Groups I and I were planted in 4- by 1-inch holes and then covered over by surrounding soil. This planting method was adapted to determine growth and yield results when planted by the farmer with no modern machinery available.

Group III specimens, on the other hand, were planted along more traditional lines, the fertilizer first being spread along the section lines, followed by furrowing in the fertilizer, followed by ½-inch planting of two seeds set six inches apart and then covered over.

On the same evening following completion of the four-day planting period of both sections of Groups I and II, performed under dry conditions, a heavy ground-soaking rain fell. A week later, following completion of the planting of both sections of Group III, under identically dry conditions, a similar ground-soaking rain fell. Hence it was possible to be certain of the number of days of plant growth in all three groups and that they were identical.

Growth Measuring Techniques

Growth of plants was measured regularly over the growing season, starting from ground level and following the straight growing tip in the corn section. The soybean demonstrated a different growth pattern from corn, starting early to branch, and thus required a different approach for determining the effect of fertilizer on the legume. Soybean growth and yield is discussed below.

Upon appearance of the corn tassel, measurements of corn specimens were made from ground to tassel tip. Cob formation was noted on or about the 62nd day, but appearance of cob was not recorded as such until the beginning appearance of its tassel "silk".

Statistically analyzed growth data of corn specimens are given in Table III, "CORN GROWTH DATA CHART (L2350)".

Data Gathering

Measurements of the plants were taken beginning at approximately one-to-two inches in height. These were not recorded per plant until after the thinning process had taken place, about the 26th day. Thereafter, each plant was measured individually, including the legumes, and recorded.

When it became apparent that the growth pattern of the legume differed greatly from that of the grass, it was suggested by a consultant, an expert in soybean growth, that a general and regular observation of the soybean growth be made, rather than an attempt to keep track of height. Clearer results of the fertilizer activity could thus be determined from the final soybean yield against the "control" specimens.

It should be noted that, while grass grows straight, permitting its growth to be measured directly, the legume produces branches, resulting in a bush, with each branch yielding a count of pods per "twig" node. The legume yield is discussed below.

Initial cob swelling on the corn stalk was noted after about 52 days and cob formation was underway by the sixty-second day. The phenomenon of multiple-cob formation was observed, particularly on stalks at either end of the rows.

Effect of Fertilizer on Rates of Growth

No measurements could be made as the 70th day of growth approached because of continuous and heavy rainfall. Thus, certain determinations must necessarily be estimated. One of the most important is the number of days required for the plants to reach maturity and whether there was a variation in number of days to do so.

From Table III data, slopes were calculated from measurements taken between day 40 and day 65, during the period of increasing growth, and estimated during the decreasing period, using the 75th day as anchor point for measurements beyond that day. The results were clear and convincing as to the value and unpredictable advantage afforded by the fertilizer compositions of the invention.

Determining the Yield

Table IV shows the "Variation of Cob Volume with Percent Component Blend Based upon Planting Depth (Groups II and III)". A statistical analysis was performed on each of the plants per row and the standard deviation was calculated to determine the truest average per datum value for each row set.

Following harvest, the entire corn yield, specimen by specimen, was numbered, marked by group, row and specimen position, shucked, labeled and measured in length (L), circumference (C), and weight. Each sample was weighed, but it became apparent that final weight data would be less than actual and so cob volume (L)(C)/3.14), $in^3$, is an alternate criterion by which yield may be determined. Weight values are not recorded in this report, but data on estimated corn density are given instead. The correlation between blend composition and estimated cob density [(W/V), $g/in^3$] is in line with the other data of this Table.

It should be pointed out that, while Group I matured on schedule, the soil area appeared to have a nutrition requirement for more than the one tablespoon of fertilizer provided. It is well known that corn absorbs nutrients heavily from the soil, and this was strikingly demonstrated as cob formation began. Slope values in Group I reflect this fact.

While I-R2, demonstrating Component A only, grew faster than did the other rows, it also diminished more rapidly and dramatically upon approaching maturity, as evidenced by the slope values apparent and obtainable from the figures in Table III, apparently because of the absence of energizing phosphates. Cob deformation also reflected this nutrient deficiency.

On the other hand, Rows II-2 and III-4, demonstrating Component B only, grew more slowly initially, but the growth rate actually increased as maturity came and went. It is suggested that the incorporation of phosphate into the plant system was initially arduous but, once there, the substance could more than provide the energy needed to produce a well-formed fruit, as was evidenced particularly in III-4 specimens.

The CI-R2 plants yielded smaller and less well-formed cobs than did any other experimental row. The slopes of Group I substantiate the weaker growth and development of these specimens.

CII-R2 did just the reverse. While it grew more slowly initially than did CII-R1, once growth was established, it picked up in rate and, as is indicated from the slopes, held its own. Although cob formation appeared weakest in its group, this could be attributed to planting at a depth of four inches.

Group III gave spectacular results, both in grass and legume specimens. Furrow planting in the traditional manner appears superior to depth planting. It further appears, as given in Length and Volume values (the latter implying circumference of cob) of Table III, that an increase in powdered skim milk percentage results in an increase in product yield. Nearly every cob in CIII-4 (0/1, powdered skim milk only) was large, well-formed and of good kernel structure.

With such results of high yield, one at first is tempted to assume that there ought to be no need to blend the powdered skim milk with powdered leaves. This may be true up to a point, but not beyond, as was demonstrated by the inventor in an earlier unpublished experiment using powdered milk only on tulip bulbs. The results of that experiment demonstrated that too much powdered milk alone as fertilizer could yield an apparent temporary distortion of the plant fruit (its seed or reproductive system). It was from these sobering observations that the concept to use leaves as the base attenuator, with powdered skim milk as the energizer, was formed and hence the present invention.

There is a preferred blend of the dry and powdered skim milk and leaf powder, which appears to yield consistently a well-formed product of acceptable length and volume and, from all appearances, a good corn density. The data in Table IV "Variation of Cob Volume with Percent Component Blend Based upon Planting Depth—Groups II and III" on the 4/1 blend of both Groups II and III, is in support of this conclusion that about 4/1 is a preferred proportion.

Soybean Yield

Similar results were observed among the soybean plants. While it was not feasible to measure each plant, it was nevertheless observed that some plants did not come up (emerge) in the Groups I and II plantings. Those that did survived well. The failure of all to thrive was attributed by the consultant to the fact that soybeans must be planted just under the soil topping.

To attest to this, the results of SIII specimens also were spectacular. SIII-R1, the "control" row to which no fertilizer was applied, showed excellent growth in all plant specimens. So did the plants of Rows 2 and 3, to which blends of 2/1 and 4/1, respectively, were applied. It was in these latter two rows that we began to see an occasional pod grouping of four or more pods to the nodule, even an occasional five- to six-pod grouping.

Conclusion

In conclusion, from the foregoing, it is apparent that the present invention provides a novel organic fertilizer and method for the production thereof, having the foregoing characteristics and advantages, as well as the following:

1. That the inventor has developed an improved fertilizer and fertilizer manufacturing process by the selection and chemical combination of three naturally-occurring substances to form a natural, biogradable fertilizer containing all the elements necessary to plant growth, namely, phosphorous, calcium, potassium, nitrogen, essential trace metals, and water.
2. That this fertilizer and its manufacturing process is an improvement over other such fertilizers and processes now in use because the beginning materials of this invention are pure, in plentiful supply, and together are complete in content for all elements essential to plant growth.
3. That this improved fertilizer and process requires no costly chemical changes to the components used, such as treatment with sulfuric acid, or the addition of any other compound additives required to complete the presence of chemical elements necessary for plant growth, such as urea, lime, nitrates, trace metals, or any other compound, chemical or natural, to effect good and natural plant growth and development.
4. That this improved fertilizer and manufacturing process does not introduce or involve components to contaminate or "burn" the soil. Each component, ground leaves which have completed their life cycle; dry and powdered skim milk obtained from any animal which is essentially fat free, and water in the pure, chemically treated or natural state, alone and when combined with each other, is biodegradable and readily utilized by the root system of the plant or the bacteria found within the soil system from which the plant grows and develops.
5. That in the grinding to a fine powder of the dried leaves which have completed their natural life cycles, i.e., dead leaves, the surface area of this component is now able to expose maximally its chemical content of nitrogenous compounds, trace metal components, and other remaining elements to any chemical and/or physicochemical forces acting upon it.
6. That intermixing the dried leaf powder intimately with dry and powdered skim milk brings into uniform proximity two compounds, containing between them all the elements necessary to effect good plant growth and development.
7. That the addition of minimal water, pure, natural or treated, to these well-intermixed dry components, instigates the formation of a new chemical substance, composition, or material which is different from any of the three original components. In and of itself, this new substance has the property to implement and support good plant growth and development.

8. That use of the three components together, rather than just singly, is necessary to improve the food and/or seed yield. For example, the dried powdered leaf alone will improve growth rate, but not seed formation, whereas the dried powdered skim milk will improve seed formation but, if not attenuated sufficiently, could cause distortions or abnormalities in the seed, and therefore the food, yield and formation.

9. That this inventor has indeed invented an improved fertilizer and fertilizer manufacturing process, in that it not only improves the food and/or seed yield by combining its components which contain all elements necessary for plant growth and development, but does so cost-effectively, using readily available component materials, one of which is in plentiful supply everywhere, and may be obtained just for the gathering.

What is dried and powdered milk?. For clarity, a definition is advisable for this term, for which the synonymous term "dried and powdered skim milk, which is essentially fat free" is now employed throughout. Most assuredly it is not sour milk, which has entirely different and totally unsatisfactory characteristics, or many other things.

Dried and powdered milk, as this term is generally employed, means dried and powdered skim milk which is essentially fat free, because that is what is commonly produced according to usual manufacturing procedure.

Dry and powdered skim milk is commonly processed from fresh, whole dry milk kept below about 65° F. Following separation from its fat content, it is pasteurized at 155° F. for 20 to 30 minutes and is then subjected to a spray process for solidification by demoisturization.

The process is simple, and the desired result is quickly achieved. Experimentation has shown that, if demoisturization occurs quickly when pasteurized skim milk is atomized into circulating dry, hot air kept below certain temperatures, a completely soluble and pure product is obtained which retains all of the "life" of the milk including its enzyme integrity.

Before embarking upon the drying step, for the purpose of cutting production costs, the pasteurized essentially fat-free milk is precondensed by vacuum evaporation in a ratio of about 4½ to 1.

When the precondensed milk is introduced into the "dry box" by atomization, it comes into contact with continually-circulating filtered, heated, and dry air. Moisture is taken up instantaneously from the thin atomized film of milk and the milk solids fall by gravity like flour or snow or pulverized sugar to the bottom of the collecting dry box or unit.

Packaging in sanitary containers adapted for particular uses and users is generally a final step. The entire process is completed within a few hours and, when the precondensing is carried out by a continuous method, can be completed in as little as thirty (30) minutes.

The advantages of a dry and powdered skim milk which is essentially fat free are manyfold. In this state it is pure, shelf-stable, and just as nutritious as when produced from the animal in the fresh liquid form, but its high stability and complete solubility render it economically advantageous from many standpoints.

When used as a natural organic fertilizer, it has been found to be a pure and complete plant nutrient, non-toxic, soil-conditioning, from a natural source and therefore biodegradable, and not having a tendency to burn the soil if used in excess, slow-release, dry, granular-like, easily distributable, and currently readily affordable.

To quote S. B. Trainer, Canadian Chemical Journal, Vol. II, No. 3, pages 71 and 72 (Mar. 1918), from which the foregoing characteristics of dry powdered skim milk have been taken:

"Chemically, milk powder is pure, that is to say, there are no preservatives, chemicals or adulterants of any kind used in the process of making it. Dr. A. McGill, chief analyst, Inland Revenue Department, has given analyses of several of this company's products in Inland Revenue Bulletin No. 257 and states that milk powder is 'genuine and true to the claims made for it'."

"Milk powder, through pasteurization, is free from disease-producing bacteria and so long as it is kept dry will keep indefinitely so far as multiplication of bacteria and the souring of the product is concerned. When dissolved in water the same conditions will apply as apply to liquid milk."

That sour milk is not even close to being in the same category or to having the same characteristics, we go on to quote Mr. Trainer further, as follows:

"Whole milk powder, however, which contains the fat of the milk, will not keep indefinitely, for the reason that the acids of the butterfat will, in the course of a few weeks, under ordinary storage conditions, begin to oxidize, and the buteric acid element breaks down and causes rancidity. In cold storage this powder will keep in perfect condition for months."

This latter does not, of course, refer to the "separated milk powder" or skim milk, from which the fat has been essentially removed, as indicated in the stated article to have no more than about 0.32% of fat therein, which is stated to be stable indefinitely (see supra).

The souring of liquid milk, whether fresh and whole, fresh and separated, or made to sour through adulteration as in cheese-making or by the action of bacteria under appropriate conditions, is due to an increased lowering of the pH of the milk, caused by an increase in the formation of lactic acid or the breakdown of the butyric acid element as set forth by Trainer.

Further evidence that souring of milk dramatically changes its composition was provided by Bosworth and Van Slyke.

An experiment by Van Slyke and Bosworth, which examined the step-by-step process of the souring of milk, clearly demonstrated that all the physicochemical attributes of non-soured milk, which the present inventor believes lend themselves to the full and healthy growth of plants, are destroyed or changed into other physiologically-unusable forms as the presence of lactic acid increases, namely:

(1) About 22% of milk sugar is changed by the lactic acid-forming bacteria, with 85% of the amount so changed being converted into lactic acid;

(2) Citric acid, important to the enzyme process, completely disappears (quite likely it is converted into lactic acid in an anaerobic environment, in the presence of a lowered pH);

(3) The insoluble inorganic constituents of the fresh milk are made soluble by the lactic acid (such as adenosine di- and tri-phosphates being converted into soluble inorganic phosphate ion);

(4) Albumin of sour milk passes through the ultra-fine porcelain filter completely; and (5) Calcium caseinate is changed into the free protein and precipitated, the calcium forming lactate.

In a second experiment, designed to study the rate and extent of chemical change under given conditions, they tested fresh, pasteurized, separator skim (not dried and powdered) milk which was inoculated with a pure culture of *B. lactic acidi* and kept at 32.2° F. Samples were taken at intervals during 96 hours for analysis. These changes were observed:

(a) Most of the changes in milk sugars occur between the 10th and the 24th hours;

(b) When the amount of lactic acid reaches 0.7%, the bacterial activity is much reduced;

(c) The acidity increases most rapidly during the first 24 hours, the rate of increase diminishing after that;

(d) The increased acidity of the serum is due to an increase of lactic acid;

(e) In the insoluble portion of the milk the free casein is the acid constituent;

(f) Ca combined as CaHPO4 goes into solution completely in 13.5 hours; and (g) Ca combined as caseinate is acted upon more slowly, complete solution requiring approximately 24 hours.

It is accordingly quite clear from Trainer as well as from the work of Van Slyke and Bosworth that sour milk is entirely different from the dried and powdered and essentially fat free skim milk employed in and according to the present invention and that the spoiled milk, whether in liquid or dry form, cannot fully enhance the complete and healthy growth of plants, because clearly some of the normal and necessary plant nutrients have been made inaccessible or unusable at the lowered pH involved in spoiled milk, which is one of the foremost reasons why spoiled milk or sour milk has no place in the method or composition of the present invention.

Copies of the Trainer reference and of the Van Slyke and Bosworth reference are provided herewith for convenience.

Various modifications and equivalents will be apparent to one skilled in the art and may be made in the compounds, compositions, methods, procedures, and embodiments of the present invention which are shown and described, without departing from the spirit or scope of the invention, and it is therefore to be understood that the invention is to be limited only by the full scope which can be legally attributed to the appended claims.

TABLE 1

Fertilizer Project
PLANTING LAYOUT
Area: 67' × 45'
Harwich Township
Ontario, Canada LEGUME: Soybean, Hodgson
GRASS: Corn, L2350
Hyland Seeds*
Blenheim, Ontario

| Fertilizer Blend Per Row | A/B | Hodgson: Soybean | L2350: Corn | Group and Row Specification | |
|---|---|---|---|---|---|
| | 0/0 | | | R1 | Group I |
| | 1/0 | | | R2 | |
| | 2/1 | | | R3 | |
| | 4/1 | | | R4 | |
| | 0/0 | | | R1 | Group II |
| | 0/1 | | | R2 | |
| | 3/1 | | | R3 | |
| | (1–16):4/1 | | | R4A | |
| | (17–55):6/1 | | 17–55   1–16 | R4B | |
| | 0/0 | | | R1 | Group III |
| | 2/1 | | | R2 | |
| | 4/1 | | | R3 | |
| | 0/1 | | | R4 | |

*Division of W. G. THOMPSON and SONS. LTD.

TABLE III

| | | | CORN GROWTH DATA CHART (L2350) | | | | | | | | | | | |
|---|---|---|---|---|---|---|---|---|---|---|---|---|---|---|
| | | | Days of Growth: | | | | | | | | | | | |
| | | | 0–8 | 9–10 | 12–14 | 15–16 | 17–21 | 26 | 27 | 28 | 33 | 41 | 42 | 44 | 47 | 48 | 49 |
| | Blend | PLANTING DATE (1986) | Height, Inches: | | | | | | | | | | | |
| Group I | | | | | | | | | | | | | | | |
| R1 | 0/0 | 6/7 | x | x | | 4–6 | 5–6 | | 9.45 | 14 | | | 29.8 | | |
| R2 | 1/0 | 6/7 | x | x | | | 6–7 | | 10.8 | 12 | | | | | |
| R3 | 2/1 | 6/8 | x | x | 4–6 | 7–7.5 | 10.2 | | 10 | | 29.2 | 29.6 | | | |
| R4A | 4/1 | 6/8 | x | x | 3–4 | 5–6 | | | 9 | | | 27.7 | | | |
| R4B | 4/1 | 6/8 | x | x | 3–4 | 5–6 | | | 9 | | | | | | |
| Group II | | | | | | | | | | | | | | | |

TABLE III-continued

CORN GROWTH DATA CHART (L2350)

| | | | | | | | | | |
|---|---|---|---|---|---|---|---|---|---|
| R1 | 0/0 | 6/9 | x | | | 5-6 | | | |
| R2 | 0/1 | 6/9 | x | | | 3-5.5 | 7.7 | | |
| R3 | 3/1 | 6/10 | x | | 3-4 | 4-5 | 9 | | |
| R4-1 | 4/1 | 6/10 | x | | 3-3.5 | 5-5.5 | 9 | 28.78 | |
| R4-2 | 6/1 | 6/10 | x | | 3 | 5-5.5 | 9.64 | 26.28 | |
| Group III | | | | | | | | | |
| R1 | 0/0 | 6/14 | | 2-3 | 3-3.5 | 3-4.5 | 10.6 | | 44.8 |
| R2 | 2/1 | 6/14 | | 2-3 | 2.5-4 | 2.5-4 | 11.8 | | 46 |
| R3 | 4/1 | 6/14 | | 2-3 | 3 | 3-4.5 | 10.4 | | 42.25 |
| R4 | 0/1 | 6/14 | | 2-3 | 3.5-4.5 | 3.5-4.5 | 11.2 | | 42 |

Extrapolated Maxima (75th day of growth):

| | A/B | GROUP I | GROUP II | GROUP III |
|---|---|---|---|---|
| R1 | 0/0 | 106.5 in. | 111 in. | 100 in. |
| R2 | 1/0 | 100 | — | — |
| | 0/1 | — | 93.5 | — |
| | 2/1 | — | — | 103 |
| R3 | 2/1 | 104 | — | — |
| | 3/1 | — | 112 | — |
| | 4/1 | — | — | 91.5 |
| R4 | 4/1 | 100.5 | — | 106 |
| R4-A | 4/1 | | 112.5 | |

| | | Days of Growth: | | | | | | | | | | | | |
|---|---|---|---|---|---|---|---|---|---|---|---|---|---|---|
| | | | 50 | 51 | 52 | 53 | /// | 60 | 61 | 62 | 63 | 64 | /// | 82 | 83 | 84 | 85 | 86 |
| | Blend | PLANTING DATE 1986 | Height, Inches: | | | | | | | | | | | | | | | |
| Group I | | | | | | | | | | | | | | | | | | |
| R1 | 0/0 | 6/7 | | | | | | 45.2 | | | | | | 76.25 | | | | 79.3 |
| R2 | 1/0 | 6/7 | | | | | | 45 | | | | | | 73 | | | | 77.81 |
| R3 | 2/1 | 6/8 | | | 44 | | | | | 72 | | | | | | 78.5 | | |
| R4A | 4/1 | 6/8 | | | 47 | | | | | 72.5 | | | | | | 84 | | |
| R4B | 4/1 | 6/8 | | | ... | | | | | ... | | | | | | 85 | | |
| Group II | | | | | | | | | | | | | | | | | | |
| R1 | 0/0 | 6/9 | | 46 | | | | | 76 | | | | | | 84 | | | |
| R2 | 0/1 | 6/9 | | 39 | | | | | 64 | | | | | 84 | | | | |
| R3 | 3/1 | 6/10 | 44.7 | | | | | | 74 | | | | | | 87.5 | | | |
| R4-1 | 4/1 | 6/10 | 44.88 | | | | | 59.5 | | | | | | | 86.5 | | | |
| R4-2 | 4/1 | 6/10 | 44.35 | | | | | 69 | | | | | | | 89.3 | | | |
| Group III | | | | | | | | | | | | | | | | | | |
| R1 | 0/0 | 6/14 | | | | | | 58.6 | 70.8 | | | | | | | | | 93.6 |
| R2 | 2/1 | 6/14 | | | | | | 58.75 | 73 | | | | | | | | | 91.7 |
| R3 | 4/1 | 6/14 | | | | | | 56 | 67 | | | | | | | | | 90.5 |
| R4 | 0/1 | 6/14 | | | | | | 54 | 70 | | | | | | | | | 87.6 |

TABLE IV

"VARIATION OF COB VOLUME WITH PERCENT COMPONENT BLEND BASED UPON PLANTING DEPTH" (Groups II and III Data)
(Standard Deviation Values)

| A/B | % B | 50 to 65-Day Slope, in./day | | Cob Length, in. Group | | Cob Volume, in. Group | | (Estimated Corn Density) W/V, g/in. | |
|---|---|---|---|---|---|---|---|---|---|
| | | II | III | II | III | II | III | II | III |
| 0/0 | — | 2.73 | 1.74 | 7.4 | 7.4 | 37.96 | 37.00 | 4.0 | 3.1 |
| 0/1 | 100 | 2.27 | 2.28 | 7.2 | 7.75 | ... | 42.18 | — | 4.2 |
| 2/1 | 33 | — | 2.04 | — | 7.6 | — | 38.37 | — | 3.4 |
| 3/1 | 25 | 2.66 | — | 7.6 | — | 38.7 | — | 3.2 | — |
| 4/1 | 20 | 1.46 | 1.57 | 7.5 | 7.5 | 38.02 | 38.02 | 3.2 | 3.7 |
| 6/1 | ca15 | 2.46 | — | 7.7 | — | 38.18 | — | 3.67 | — |

I claim:

1. A novel biodegradable organic fertilizer consisting essentially of (A) dead leaves dried and finely ground, (B) skim milk which is dried and powdered and essentially fat free, and (C) water in an amount to give a kneadable mass, the composition being dried and granular.

2. Fertilizer of claim 1 wherein the proportions of A to B by volume are between about 1:1 and 10:1.

3. Fertilizer of claim 1 wherein the proportions of A to B by volume are between about 1:1 and 6:1.

4. Fertilizer of claim 1 wherein the proportions of A to B by volume are about 4:1.

5. The method of producing a fertilizer of claim 1 consisting essentially of the steps of drying and finely dividing dead leaves, admixing the same with dried and powdered skim milk which is essentially fat free, kneading the same into a mass in the presence of a sufficient amount of water for this purpose, and drying and granulating the mass.

* * * * *

UNITED STATES PATENT AND TRADEMARK OFFICE
CERTIFICATE OF CORRECTION

PATENT NO. : 4,957,534

DATED : Sep. 18, 1990

INVENTOR(S) : Dawn E. Francis

It is certified that error appears in the above-identified patent and that said Letters Patent is hereby corrected as shown below:

Column 9, line 45; "$4\tfrac{1}{2}$" should read -- $4\tfrac{1}{4}$ --.

Column 13/14, "Table III-continued," under heading "Extrapolated Maxima (75th day of growth):" insert the following: first column, approximately line 23, under "R4-A" insert -- R4-B --, second column under "4/1" insert -- 6/1 --, 4th column under "112.5" insert -- 108 --.

Signed and Sealed this

Tenth Day of March, 1992

Attest:

HARRY F. MANBECK, JR.

*Attesting Officer*    *Commissioner of Patents and Trademarks*